United States Patent [19]

Nukui

[11] Patent Number: 5,239,648
[45] Date of Patent: Aug. 24, 1993

[54] COMPUTER NETWORK CAPABLE OF ACCESSING FILE REMOTELY BETWEEN COMPUTER SYSTEMS

[75] Inventor: Harumi Nukui, Kanagawa, Japan

[73] Assignee: Kabushiki Kaisha Toshiba, Kanagawa, Japan

[21] Appl. No.: 762,456

[22] Filed: Sep. 19, 1991

[30] Foreign Application Priority Data

Sep. 21, 1990 [JP] Japan .................. 2-252864

[51] Int. Cl.[5] .................. H04L 9/00; G06F 12/14
[52] U.S. Cl. .................. 395/600; 380/4;
380/25; 364/286.5; 364/222.5; 364/242.94;
364/DIG. 1
[58] Field of Search ............ 395/725, 575, 425, 200,
395/325, 600; 380/4, 25, 49, 23; 235/380, 382;
340/825.31, 825.34; 379/95

[56] References Cited

U.S. PATENT DOCUMENTS

| | | | |
|---|---|---|---|
| 4,135,240 | 1/1979 | Ritchie | 364/200 |
| 4,218,738 | 8/1980 | Matyas et al. | 364/200 |
| 4,531,023 | 7/1985 | Levine | 179/2 R |
| 4,825,354 | 4/1989 | Agrawal et al. | 364/200 |
| 4,962,449 | 10/1990 | Schlesinger | 364/200 |
| 5,012,515 | 4/1991 | McVitie | 380/49 |
| 5,032,979 | 7/1991 | Hecht et al. | 364/200 |
| 5,050,207 | 9/1991 | Hitchcock | 379/96 |
| 5,060,263 | 10/1991 | Bosen et al. | 380/25 |
| 5,101,373 | 3/1992 | Tanioka et al. | 364/900 |
| 5,133,053 | 7/1992 | Johnson et al. | 395/200 |

OTHER PUBLICATIONS

R. Reinauer, "UNIX System V. 3 Remote File Sharing Capabilities and Administration", Unisphere, Sep. 1986 pp. 64–69.

A. Osadzinski, "Remote File Access", Systems International (Jul. 1986), vol. 14, No. 7, pp. 51 & 54, Networking.

D. M. Nessett, "Factors Affecting Distributed System Security", Lawrence Livermore National Laboratory, Livermore, CA 94550, Proceedings of the 1986 IEEE Symposium on Security and Privacy, Apr. 7–9, 1986, Oakland, California, pp. 204–222.

Paul A. Karger, "Authentication and Discretionary Access Control in Computer Networks", 8246 Computers & Security 5 (1986) Dec., No. 4, Amsterdam, The Netherlands, pp. 314–324.

Ching-Yi Wang et al., "Access Control in a Heterogeneous Distributed Database Management System", Sixth Symposium on Reliability in Distributed Software and Database Systems, pp. 84–92.

Primary Examiner—Michael R. Fleming
Assistant Examiner—Gopal C. Ray
Attorney, Agent, or Firm—Finnegan, Henderson, Farabow, Garrett & Dunner

[57] ABSTRACT

Each computer system of the computer network according to the present invention has a management information storage portion for storing information with respect to an access authority in accordance with an owner ID and a conversion rule storage portion for storing a rule for converting the formats of a user ID and an access authority. Each computer system adds a machine ID to a user ID and sends the resultant ID to another computer system when a remote access request is issued. In addition, the computer system determines whether or not the formats of the user ID and the access authority being received accord with those of a local computer system when a remote access is accepted. The computer system converts the formats of the user ID and the access authority being received into those of the local computer system in accordance with a predetermined conversion rule when the formats of the local computer system are not matched with those on the remote computer system. Thereafter, the computer system compares the user ID and the access authority whose formats have been converted with information of the access authority stored in the access authority storage portion and determines whether or not to execute the remote access.

12 Claims, 6 Drawing Sheets

FIG. 2
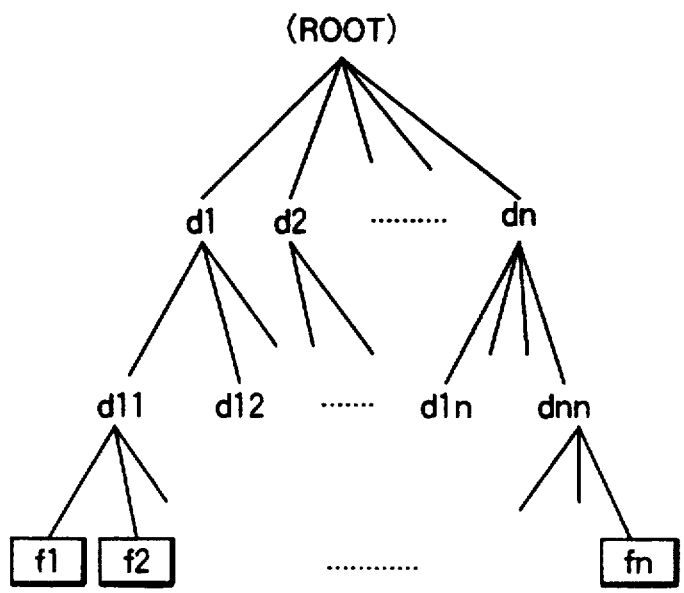
FIG. 3
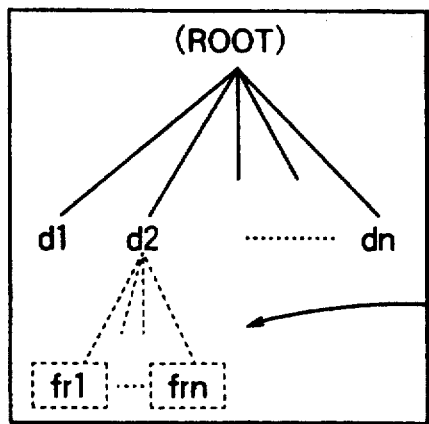
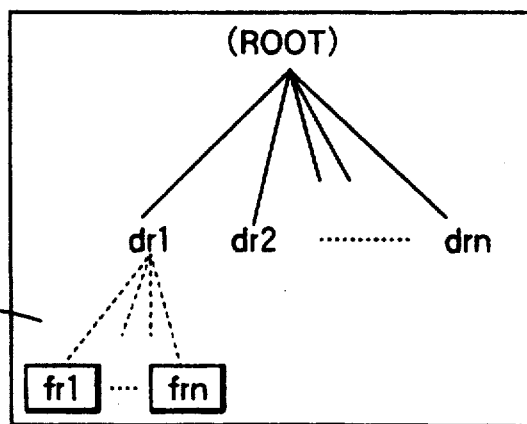

FIG. 4

| ACCESS AUTHORITY / ID | READ | WRITE | EXECUTE | MOVE | DELETE |
|---|---|---|---|---|---|
| OWNER PERSONAL | ○ | ○ | ○ | ○ | ○ |
| OWNER GROUP | – | ○ | – | ○ | ○ |
| OTHER | – | ○ | – | – | – |

○ REPRESENTS PRESENCE OF AUTHORITY.

FIG. 5

| A / B | READ | WRITE | EXECUTE | MOVE | DELETE |
|---|---|---|---|---|---|
| READ | ○ | – | – | – | – |
| WRITE | – | ○ | – | ○ | ○ |
| EXECUTE | – | – | ○ | – | – | ing files thereof.

COMPUTER NETWORK CAPABLE OF ACCESSING FILE REMOTELY BETWEEN COMPUTER SYSTEMS

BACKGROUND OF THE INVENTION

1. Field of the Invention

The present invention relates to a computer network for connecting a plurality of computer systems through a communication medium and a method of accessing files thereof.

2. Description of the Related Art

Thus far, there has been a computer network where the user of a computer system can remotely access a file that another computer system has without necessity of a complicated log-on procedure.

The file access in such a computer network is performed under condition that a user ID and an access authority on the request side are matched with those on the accept side.

However, when the computer type on the request side differs from that on the accept side, because of differences of the formats of the user ID and the access authority, the computer system on the access accept side may not correctly determine the validity of an access request from the computer system on the access request side. In this case, the computer system on the request side has to perform a particular procedure so as to validly access a file that the computer system on the accept side has. Thus, the advantage of the remote access is lost.

SUMMARY OF THE INVENTION

Therefore, an object of the present invention is to provide a computer network for validly performing a remote access of files even if the formats of the user ID and the access authority on the access request side differ from those on the access accept side.

To accomplish such an object, the computer network according to the present invention comprises a computer network connected with a plurality of computer systems through a communication medium for accessing files that the plurality of computer systems have from all of the plurality of computer systems, each of the plurality of computer systems comprising access authority information storage means for storing information with respect to an access authority in accordance with an owner ID, means for adding a machine ID to a user ID and for sending the resultant ID to another computer system of the plurality of computer systems when a remote access request is issued, means for determining whether or not the formats of the user ID and the access authority being received accord with those of a local computer system of the plurality of computer systems when a remote access is accepted, means for converting the formats of the user ID and the access authority being received into those of the local computer system of the plurality of computer systems in accordance with a predetermined conversion rule when the formats of the local computer system are not matched with those on the remote computer system, and means for comparing the user ID and the access authority whose formats have been converted with information of the access authority stored in the access authority storage means and for determining whether or not to execute the remote access.

Thereby, according to the present invention, even if the formats of the user ID and the access authority on the access request side differ from those on the access accept side, remote files can be validly accessed.

BRIEF DESCRIPTION OF DRAWINGS

FIG. 2 is a schema showing a tree construction of a file group that a computer system has;

FIG. 3 is a schema describing relations of file groups that two computer systems have;

FIG. 4 is a table outlining information with respect to access authority;

Fig. 5 is a table outlining a conversion rule;

DESCRIPTION OF PREFERRED EMBODIMENT

Figure 1:
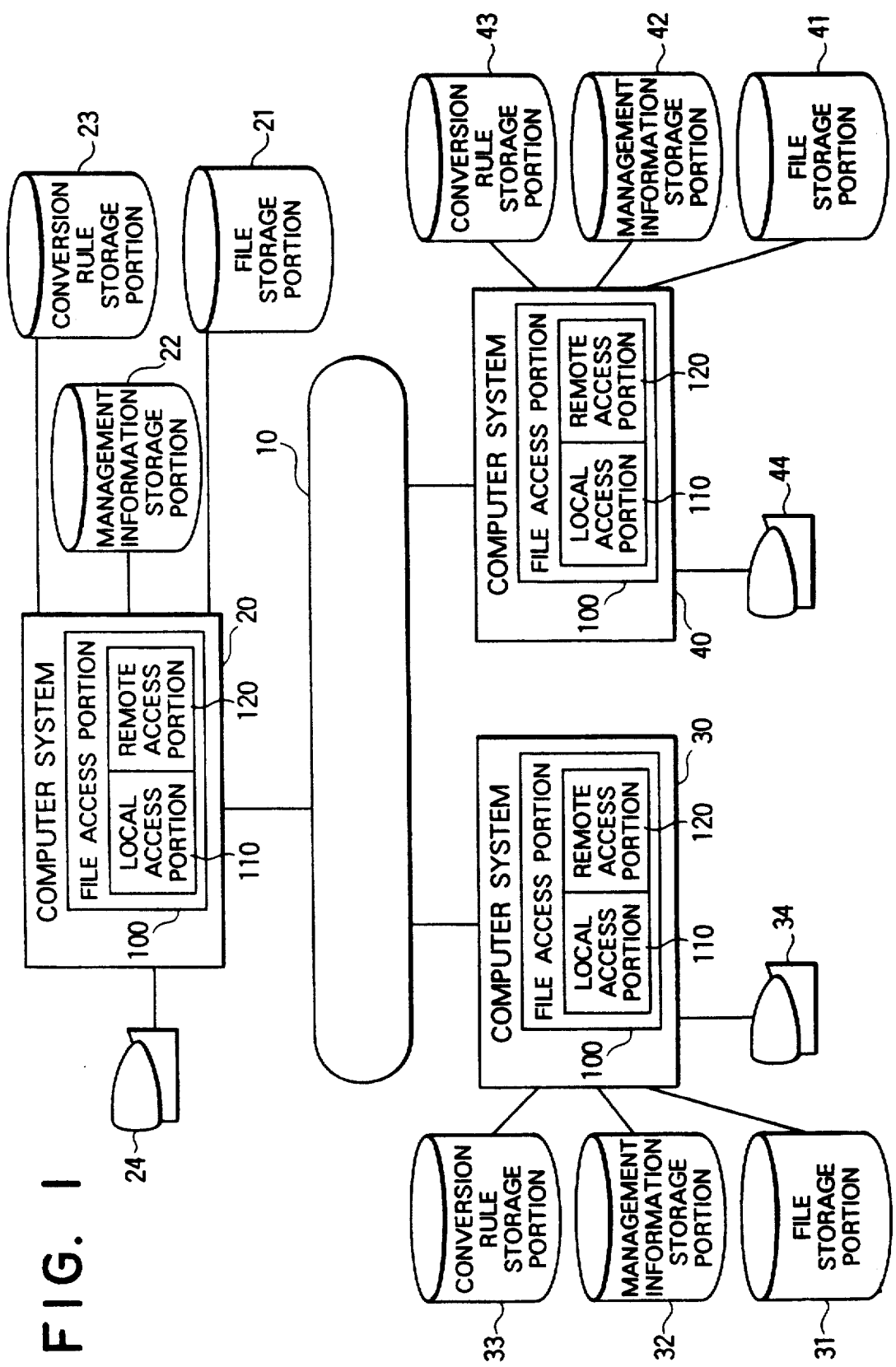
FIG. 1 is a block diagram showing an overall construction of a computer network of an embodiment according to the present invention.

FIG. 1 is a block diagram showing an overall construction of a computer network of an embodiment according to the present invention.

In the FIGURE, reference numeral 10 is a communication medium. Reference numerals 20, 30, and 40 are computer systems which are connected each other through the communication medium 10. The computer system 20, 30, 40 is connected with a file storage portion 21, 31, 41 for storing a plurality of files, a management information storage portion 22, 32, 42 for storing information necessary for managing a file access, a conversion rule storage portion 23, 33, 43 for storing a conversion rule for compensating differences of the formats of a user ID and an access authority in accordance with a computer type, and a keyboard/CRT 24, 34, 44.

The management information storage portion 22, 32, 42 stores a path to each file stored in the file storage portion 21, 31, 41. A file group stored in the file storage portion 21, 31, 41 is identified by a path which is routed from "ROOT" disposed at the top of the tree construction to a directory d. Thus, the path to a file fl is represented with "/d1/d11/fl/."

In this computer network, files that other computer systems have can be treated as those that a particular computer system has. For example, assume that two computer systems have respective file groups in a tree construction as shown in FIG. 3. In such a construction, the operator of one computer system A declares that the directory d2 is the same as the directory dr1 between the tree construction of the file group which the computer system A has and that which the computer system B has. Thus, the computer system A can treat a sub file group in the directory dr1 or below of a file group that the computer system B has as a file group in the directory d2 or below that the computer system A has.

The management information storage portion 22, 32, 42 stores information with respect to access authority of each file as information for determining the validity of executing a file access.

FIG. 4 is a table outlining information with respect to access authority. In other words, the information with respect to access authority is composed of an owner ID (a personal ID and a group ID) of each file and an access authority type (for example, read, write, delete, move, and execute) permitted to the owner ID.

In addition, the management information storage portion 22, 32, 42 stores a user ID (a personal ID and a group ID) which is used to request a file access.

In such a construction, a problem takes place when the format of the access authority on the access request side differs from that on the access accept side due to difference of computer types and the like therebetween. For example, when the access authority of one computer system and that of another computer system are set with respect to five types "read, write, delete, move, and execute" and three types "read, write, and execution", respectively, since the access authority on one side does not match that on another side, a file access cannot be validly performed.

To prevent that, in the embodiment according to the present invention, the conversion rule storage portion 23, 33, 34 stores a conversion rule. FIG. 5 shows a table outlining a conversion rule with respect to the access authority. In other words, in the conversion rule, the access request types "delete and move" issued from the computer system B to the computer system A are substituted into the access authority type "write" by the computer system A.

In addition, the conversion rule storage portion 23, 33, 43 also stores another conversion rule for compensating a difference between the format of the user ID on one side and that on the other side.

For example, assume that the user ID is represented with 16 bits in the computer system A and with 32 bits in the computer system B. In this case, as the conversion rule that the computer system A has, a data mapping rule with respect to an ID reading memory area for treating 32 bit data as 16 bit data is defined, while as another conversion rule that the computer system B has, another mapping rule for treating 16 bit data as 32 bit data is defined.

A file access portion 100 of the computer system 20, 30, 40 is functionally categorized as a local access portion 110 for executing a file access in a local computer system and a remote access portion 120 for executing a remote file access with another computer system.

Then, with reference to FIGS. 6 to 8, a file access operation in the computer network according to the present invention will be described.

Figure 6:
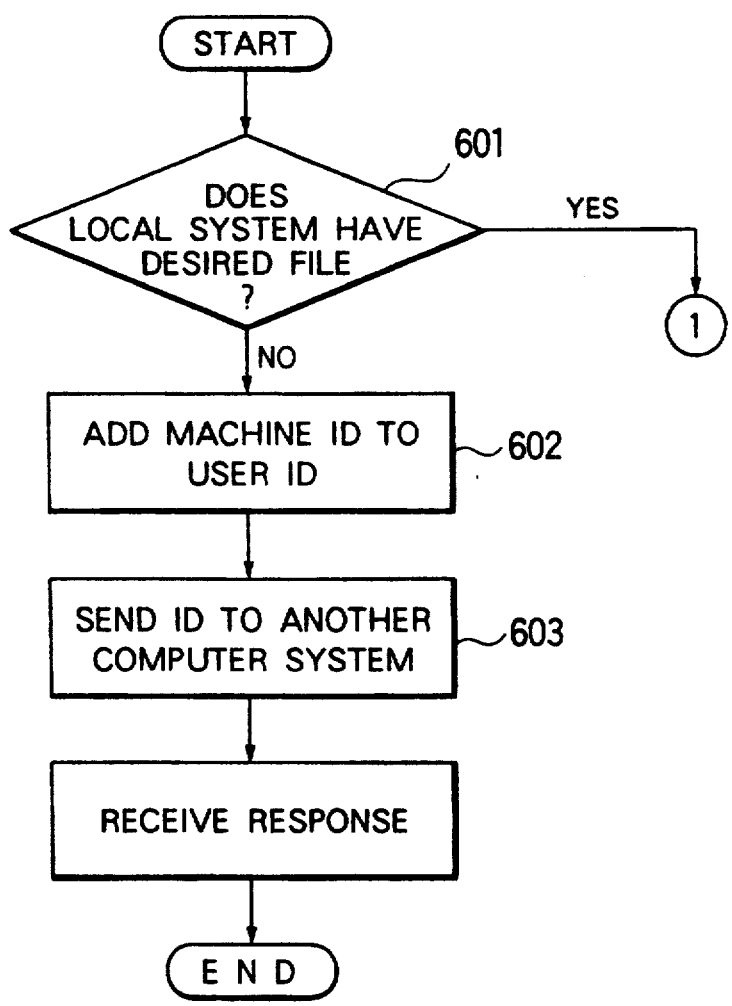
FIG. 6 is a flow chart showing a flow of a process for issuing an access request.

As shown in FIG. 6, when the computer system 20 issues a file access request, the file access portion 100 looks into the presence of a desired file in the file storage portion 21 thereof in accordance with information stored in the management information storage portion 22 (in the step 601).

Figure 7:
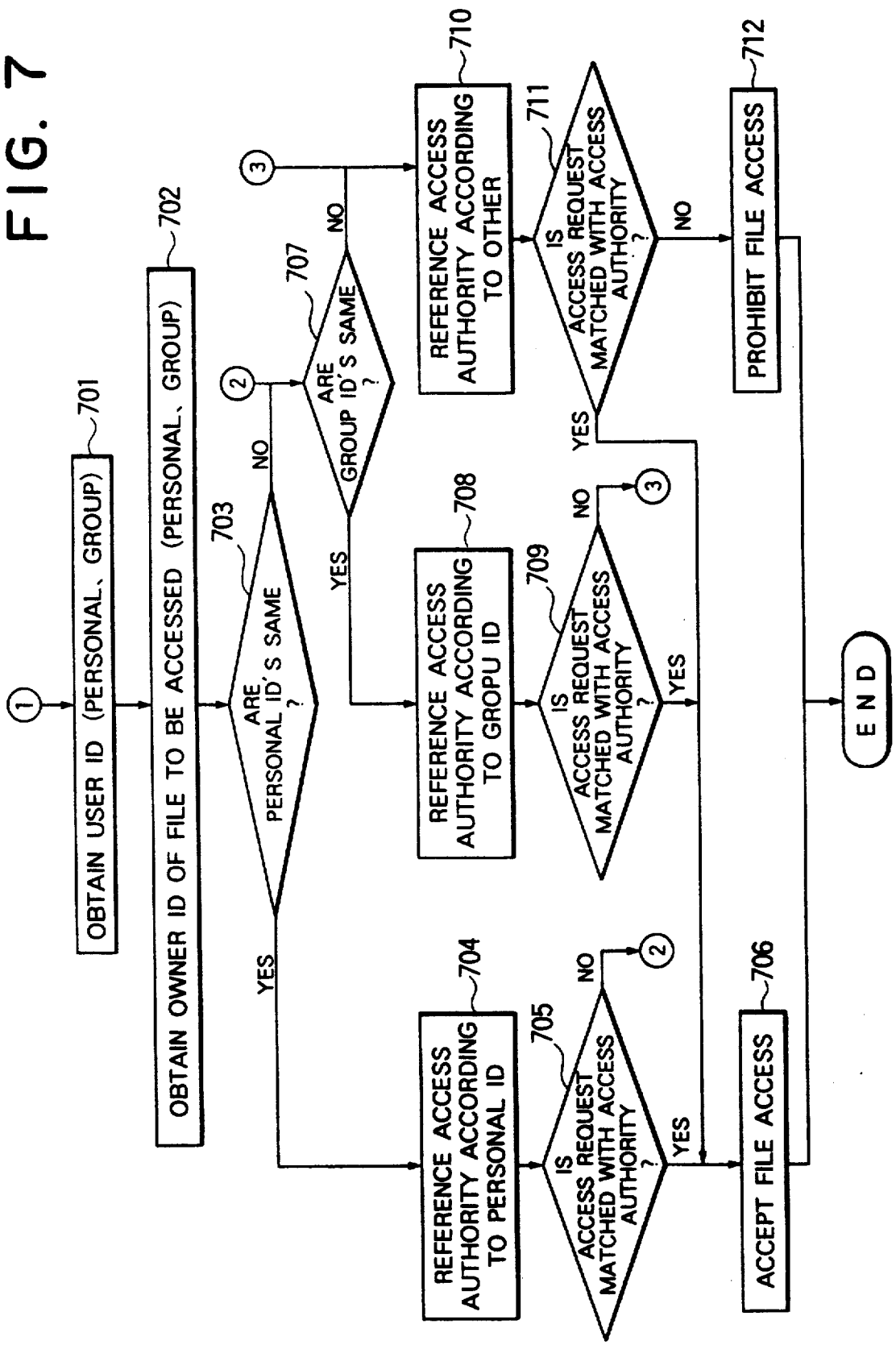
FIG. 7 is a flow chart showing a flow of a process for determining the validity of a file access.
Figure 8:
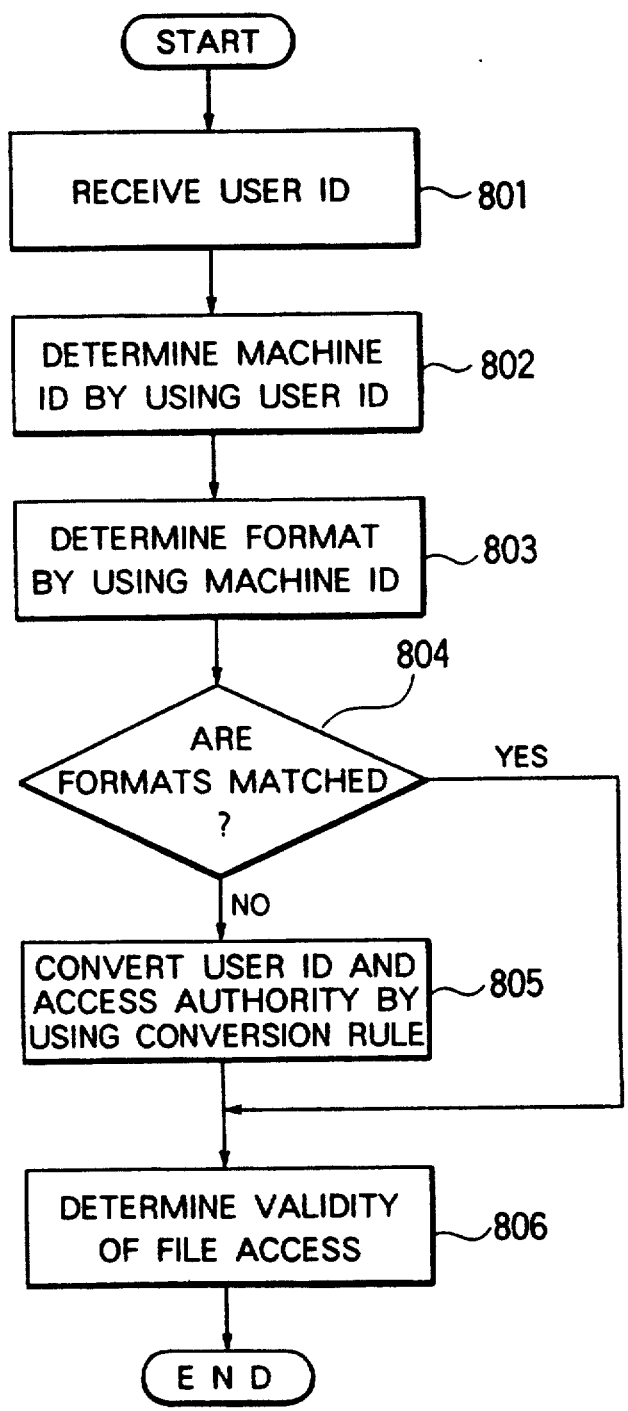
FIG. 8 is a flow chart showing a flow of a process performed when a remote access request is accepted.

When the file access portion 100 found the desired file in the local computer system 20, it obtains a personal user ID and a group user ID from the management information storage portion 22 as shown in FIG. 7 (in the step 701).

Thereafter, the file access portion 100 looks into an owner ID (a personal ID and a group ID) stored in the management information storage portion 22 (in the step 702).

Thereafter, the file access portion 100 compares the personal ID of the user ID with that of the owner ID (in the step 703). When they are matched, the file access portion 100 references the access authority in accordance with the owner personal ID (in the step 704).

Thereafter, the file access portion 100 looks into the presence of the type of the real access request which is matched with one of the types of the access authority being referenced (in the step 705). When the file access portion 100 found the type of the access authority which was matched, it accepts the file access (in the step 706).

When the file access portion 100 could find the type of the access authority which was matched or when it found that the personal ID of the user ID did not accord with that of the owner ID, it compares the group ID of the user ID with that of the owner ID (in the step 707).

When the group ID of the user ID is matched with that of the owner ID, the file access portion 100 references the access authority in accordance with the owner group ID (in the step 708).

Thereafter, the file access portion 100 looks into the presence of the type of the real access request which is matched with one of the types of the access authority being referenced (in the step 709). When the file access portion 100 found the type of the access authority which was matched, it accepts the file access (in the step 706).

When the file access portion 100 could not find the type of the access authority which was matched or when it found that the personal ID of the user ID did not accord with that of the owner ID in the step 707, it references another type of the access authority (in the step 710).

Thereafter, the file access portion 100 looks into the presence of the type of the real access request which is matched with one of the types of the access authority being referenced (in the step 711). When the file access portion 100 found the type of the access authority which was matched, it accepts the file access (in the step 706). When the file access portion 100 could not find the type of the access authority which was matched, it prohibits the file access (in the step 712).

When the file access portion 100 determined that the desired file was present in another computer system 30, 40 in the step 601, it adds a machine ID of the local computer system 20 to the user ID (the personal ID and the group ID) in the management information storage portion 22 (in the step 602) and then sends them to another computer system 30, 40 so as to issue a remote access request (in the step 603). Thereafter, the file access portion 100 enters a standby state for waiting for a response from the other computer system 30, 40.

The file access portion 100 of the other computer system 30, 40 which accepted the remote access request receives the user ID (in the step 801) and looks into the machine ID from the user ID being received (in the step 802).

Thereafter, the file access portion 100 determines the formats of the user ID and the access authority in accordance with the machine ID (in the step 803).

Thereafter, the file access portion 100 determines whether or not the formats being determined are matched with those of the local computer system (in the step 804).

When the file access portion 100 determined that the formats were not matched, it converts the formats of the user ID and the access authority stored in the conversion rule storage portion 33, 43 into those of the local computer system 30, 40 (in the step 805).

Thereafter, the file access portion 100 determines whether or not to accept the file access in the procedure shown in FIG. 7 in accordance with the user ID and the access authority where their formats have been converted (in the step 806).

Thus, according to the computer network of the present invention, even if the formats of the user ID and the access authority of one computer system 20, 30, 40 differ from those of the other computer system 20, 30, 40, by compensating the differences with the conversion rules, a remote file access can be validly performed without necessity of a special procedure.

What is claimed is:

1. A computer network, where a plurality of computer systems are connected through a communication medium, each computer system being capable of accessing files of another computer system, each computer system being given a specific machine ID, each computer system having set kinds of file operations per file, each file being given a specific file ID, and a format of the file ID being set per computer system, comprising:

a computer system accessing the file, including
means for adding the machine ID to the file ID of the requested file when access to the file of another computer system is requested; and
means for sending the file ID and the added machine ID to the other computer system; and a computer system whose the file is accessed, including
a first table storing correspondence relationships between the kinds of file operations in the computer accessing the file, and the kinds of file operations in the computer whose the file is accessed;
a second table storing correspondence relationships between the format of the file ID in the computer accessing the file, and the format of the file ID in the computer whose the file is accessed;
a third table storing the file ID and the kinds of capable operations per file;
means for receiving the file ID and the added machine ID from the computer system accessing the file;
means for discriminating the computer system whose file is accessed based on the machine ID received by the receiving means;
first determination means for determining whether the kinds of file operations of the discriminated computer system coincide with the kinds of file operations of the computer system whose file is accessed;
first conversion means for, when the kinds of the two computer systems do not coincide with each other, converting the kinds of file operations system to the kinds of file operations of the computer system whose file is accessed in accordance with the first table;
second determination means for determining whether the format of the file ID of the discriminated computer system coincides with the format of the file ID of the computer system whose file is accessed;
second conversion means for, when the formats of the two computer systems do not coincide with each other, converting the format of the file ID system to the format of the file ID of the computer system whose file is accessed in accordance with the second table; and
means for judging whether the requested access is allowed based on comparison of the converted file ID and the converted kinds of file operations with the file ID and the kinds of file operation stored int eh third table.

2. The computer system of claim 1, the computer system accessing the file, further including:
means for determining whether the file, to which access is requested, exists in the computer system accessing the file; and for, when the file does not exist, sending the file ID and the added machine ID to the other computer machine by the sending means.

3. The computer system of claim 1, wherein the kinds of file operations are reading, writing, deleting, moving, and executing a file.

4. The computer system of claim 1, wherein a difference in the format of file ID is a difference in the number of bits per frame.

5. A computer network, where a plurality of computer systems are connected through a communication medium, each computer system being capable of accessing files of another computer system, each computer system being given a specific machine ID, each computer system having set kinds of file operations per file, each file being given a specific file ID, comprising:

a computer system accessing the file, including
means for adding the machine ID to the file ID of the requested file when access to the file of another computer system is requested; and
means for sending the file ID and the added machine ID to the other computer system; and a computer system whose the file is accessed, including
a first table storing correspondence relationships between the kinds of file operations in the computer accessing the file, and the kinds of file operations in the computer whose file is accessed;
a second table storing the file ID and the kinds of capable operations per file;
means for receiving the file ID and the added machine ID from the computer system accessing the file;
means for discriminating the computer system whose file is accessed based on the machine ID received by the receiving
means for determining whether the kinds of file operations of the discriminated computer system coincide with the kinds of file operations of the computer system whose the file is accessed;
means for, when the kinds of the two computer systems do not coincide with each other, converting the kinds of file operations to the kinds of file operations so the computer system whose file is accessed in a accordance with the first table; and
means for judging whether the requested access is allowed based on comparison of the converted kinds of file operations and the sent file ID with the file ID and the kinds of file operations stored int eh second table.

6. The computer system of claim 5, wherein the computer system accessing the file, further includes
means for determining whether the file, to which access is requested, exists in the computer system accessing the file; and for, when the file does not exist, sending the file ID and the added machine ID to the other computer machine by the sending means.

7. The computer system of claim 5, wherein the kinds of file operations are reading, writing, deleting, moving, and executing a file.

8. A computer network, where a plurality of computer systems are connected through a communication medium, each computer system being capable of accessing files of another computer system, each computer system being given a specific machine ID, each file being given a specific fie ID, a format of the file ID being set per computer system, comprising:

a computer system accessing the file, including
    means for adding the machine ID to the file ID of the requested file when access to the file of another computer system is requested; and
    means for sending the file ID and the added machine ID to the other computer system; and a computer system whose file is accessed, including
    a first table storing correspondence relationships between the format of the file ID in the computer accessing the file, and the format of the file ID in the computer whose file is accessed;
    a second table sorting the file ID per file;
    means for receiving the file ID and the added machine ID from the computer system accessing the file;
    means for discriminating the computer system whose file is accessed based on the machine ID received by the receiving means;
    means for determining whether the format of the file ID of the discriminated computer system coincides with the format of the file ID of the computer system whose file is accessed;
    means for, when the formats of the two computer systems do not coincide with each other, converting the format of the file ID to the format of the file ID of the computer system whose file is accessed in accordance with the first table; and
    means for judging whether the requested access is allowed based on comparison of the converted file ID with the file ID stored in the second table.

9. The computer system of claim 8, wherein the computer system accessing the file, further includes
    means for determining whether the file, to which access is requested, exists in the computer system accessing the file; and for, when the file does not exist, sending the file ID and the added machine ID to the other computer machine by the sending means.

10. The computer system of claim 8, wherein a difference in the format of file ID is a difference in the number of bits per frame.

11. A method for accessing a file in a computer network, where a plurality of computer systems are connected through a communication medium, each computer system being capable of accessing files of another computer system, each computer system being given a specific machine ID, each computer system being set kinds of file operations per file, each file being given a specific file ID, a format of the file ID being set per computer system, comprising the steps of:

in the computer system accessing the file,
    adding the macing ID to the file ID of the requested file when access to the file of another computer system is requested; and
    sending the file ID and the added machine ID to the other computer system; and in the computer system whose file is accessed, having
    a first table storing correspondence relationships between the kinds of file operations in the computer accessing the file, and the kinds of file operations in the computer whose file is accessed; a second table storing correspondence relationships between the format of the file ID in the computer accessing the file, and the format of the file ID in the computer whose file is accessed; and a third table storing the file ID and the kinds of capable operations per file,
    receiving the file ID and the added machine ID from the computer system accessing the file;
    discriminating the computer system whose file is accessed based on the machine ID received by the receiving means;
    determining whether the kinds of file operations of the discriminated computer system coincide with the kinds of file operations of the computer system whose the file is accessed;
    converting the kinds of file operations of the discriminated computer system to the kinds of file operations of the computer system whose file is accessed in accordance with the first table, when the kinds of the two computer systems do not coincide with each other;
    determining whether the format of the file ID of the discriminated computer system coincides with the format of the file ID of the computer system whose file is accessed;
    converting the format of the file ID system to the format of the file ID of the computer system whose file is accessed in accordance with the second table when the formats of the two computers systems do not coincide with each other; and
    judging whether the requested access is allowed based on comparison of the converted file ID and the converted kinds of file operations with the file ID and the kinds of file operations stored in the third table.

12. The method of claim 11, wherein the computer system accessing the file, is the further step of:
    determining whether the file, to which access is requested, exists in the computer system accessing the file; and for, when the file does not exist, sending the file ID and the added machine ID to another computer machine by the sending means.

* * * * *

UNITED STATES PATENT AND TRADEMARK OFFICE
CERTIFICATE OF CORRECTION

PATENT NO. : 5,239,648
DATED : August 24, 1993
INVENTOR(S) : Harumi Nukui

It is certified that error appears in the above-indentified patent and that said Letters Patent is hereby corrected as shown below:

Claim 1, column 5, line 23, delete "the".
Claim 1, column 5, line 28, delete "the" (second occurence).
Claim 1, column 5, line 33, delete "the" (third occurence).
Claim 1, column 6, line 2, change "int eh" to --in the--.
Claim 5, column 6, line 45, after "receiving", insert --means;--
Claim 5, column 6, line 49, delete "the".
Claim 5, column 6, line 60, change "int eh" to --in the--.
Claim 8, column 7, line 9, change "fie" to --file--.
Claim 11, column 8, line 4, change "macing" to --machine--.

UNITED STATES PATENT AND TRADEMARK OFFICE
CERTIFICATE OF CORRECTION

PATENT NO. : 5,239,648
DATED : August 24, 1993
INVENTOR(S) : Harumi Nukui

It is certified that error appears in the above-indentified patent and that said Letters Patent is hereby corrected as shown below:

Claim 11, column 8, lines 43-44, change "computers" to --computer--.

Signed and Sealed this

Fifth Day of July, 1994

Attest:

BRUCE LEHMAN

Attesting Officer    Commissioner of Patents and Trademarks